(12) United States Patent
Mrozek et al.

(10) Patent No.: US 9,695,258 B2
(45) Date of Patent: Jul. 4, 2017

(54) POLYMERIC MATERIALS WITH RESPONSIVE ADHESION AND/OR MECHANICAL PROPERTIES

(71) Applicant: U.S. Army Research Laboratory ATTN: RDRL-LOC-I, Adelphi, MD (US)

(72) Inventors: Randy A. Mrozek, Baltimore, MD (US); Joseph L. Lenhart, Port Deposit, MD (US); Michael C. Berg, Baltimore, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 223 days.

(21) Appl. No.: 14/318,736

(22) Filed: Jun. 30, 2014

(65) Prior Publication Data
US 2015/0376304 A1 Dec. 31, 2015

(51) Int. Cl.
*C08F 22/06* (2006.01)
*C08F 8/00* (2006.01)

(52) U.S. Cl.
CPC .............. *C08F 22/06* (2013.01); *C08F 8/00* (2013.01)

(58) Field of Classification Search
CPC .................................. C08F 22/06; C08F 8/00
See application file for complete search history.

(56) References Cited

U.S. PATENT DOCUMENTS 5,024,784 A * 6/1991 Eich .................. G02F 1/132
252/299.01

8,227,551 B2 * 7/2012 Lesser .................... C08J 3/24
522/157
2010/0328410 A1 * 12/2010 Grzybowski ........ C09D 11/02
347/100
2010/0328412 A1 * 12/2010 Watanabe ............. B41M 5/282
347/218
2012/0228520 A1 * 9/2012 Tan ..................... A61K 9/0009
250/492.1

OTHER PUBLICATIONS

K. Autumn, et al., "Effective Elastic Modulus of Isolated Gecko Setal Arrays", The Journal of Experimental Biology 209, Published by The Company of Biologists 2006, pp. 3558-3568.

* cited by examiner

*Primary Examiner* — Sanza McClendon
(74) *Attorney, Agent, or Firm* — Robert Thompson

(57) ABSTRACT

Methods of adjusting the mechanical properties of a polymeric material may include forming a polymer network having a plurality of permanent cross-links and coupled to a plurality of reversible cross-links, wherein the polymer network has a shear storage modulus of greater than about $4\times10^4$ Pa; and heating the polymer network using a heat source to dissociate the reversible cross-links, wherein heating the polymer network reduces the shear storage modulus to less than about $4\times10^4$ Pa. In some embodiments, a polymeric material may include a polymer network comprising a plurality of permanent cross-links and coupled to a plurality of reversible cross-links that are dissociable with the application of a stimulus and associable with the removal of the stimulus, wherein the shear storage modulus of the polymer network is less than about $4\times10^4$ Pa in the presence of the stimulus and greater than about $4\times10^4$ Pa in the absence of the stimulus.

12 Claims, 7 Drawing Sheets

POLYMERIC MATERIALS WITH RESPONSIVE ADHESION AND/OR MECHANICAL PROPERTIES

GOVERNMENT INTEREST

The presently disclosed subject matter was made with U.S. Government support. Thus, the United States Government has certain rights in the disclosed subject matter. The embodiment described and claimed herein may be manufactured, used, sold and/or licensed by or for the United States Government without the payment royalties thereon.

FIELD OF USE

Embodiments of the present invention generally relate to polymeric materials and, more particularly, to polymeric materials having reversible mechanical and adhesive properties and methods of preparing polymeric materials having reversible mechanical and adhesive properties.

BACKGROUND

The inventors have observed a need in the robotics industry for materials that are responsive to changes in adhesion, modulus, and mechanical damping. The development of responsive materials has been an intense area of research for over a decade. For example, the incorporation of multiple types of intermolecular interactions, including chemical cross-linking, physical cross-linking, hydrogen bonding, and metal co-ordination, have been previously explored for use in shape memory polymers. Shape memory polymers can be fixed into temporary shapes and return to their permanent shape through a temperature change. These materials are relatively rigid to provide some actuation and the necessary force to return to their original shape after deformation. However, shape memory gels typically have a modulus well into the 100 MPa range or are used in a stacked configuration with a stiffer material.

Due to the variety of potential commercial uses for reversible adhesives, many proposed approaches have been explored. Perhaps the most prevalent approach is bio-inspired adhesive approaches, often referred to as "gecko adhesion." Gecko adhesion is the result of low strength Van der Waals forces that require a large amount of surface area to promote adhesion. As a result, the material approaches either involve very soft compliant materials or intricately structured substrates similar to the gecko foot-hair. Significant research has also been done utilizing adhesive proteins of the catecholic amino acid 3,4-dihydroxy-L-phenylalinine. All of these approaches require a significant mechanical force to remove the adhered substrate that will increase as the adhesive strength is improved. To decrease the pull-off force required to remove an adhesive, not necessarily bio-inspired, a number of strategies have been employed including a conversion from a sticky gel to a solution, chemically induced adhesive changes, and the use of differential expansive bleeding of poly(E-caprolactone). However, these approaches are not applicable to robotic systems due to issues with reproducibility cycles, implementation, and compliance, respectively. Reduction in pull off force has also been investigated using shape memory alloys in a bi-layer structure with a tack epoxy and in parallel plate geometry with hydrogen bonding groups between plates. However, these approaches do not address a change in adhesion only automated pull-off which requires additional energy to facilitate.

Current classes of materials that can vary their stiffness and damping include shape memory polymers, shape memory alloys, ionic gels, magneto-rheological fluids and electro-rheological fluids. For applications that require high damping, shape memory alloys are far too rigid. In contrast, magneto and electro rheological fluids are liquid, making them difficult to implement in many component geometries. Previous work on shape memory alloys and ionic gels has largely focused on stiffer, less compliant materials on the order of several MPa or higher.

Therefore, the inventors have provided improved polymeric materials having reversible mechanical and adhesive properties and methods of preparing polymeric materials having reversible mechanical and adhesive properties.

SUMMARY

Embodiments of the present invention relate to methods of adjusting the mechanical properties of a polymeric material, where the method may include forming a polymer network having a plurality of permanent cross-links and a plurality of reversible cross-links, wherein the polymer network has a shear storage modulus of greater than about $4 \times 10^4$ Pa; and heating the polymer network using a heat source to dissociate the reversible cross-links, wherein heating the polymer network reduces the shear storage modulus to less than about $4 \times 10^4$ Pa.

In some embodiments, the present invention relates to a polymeric material comprising a polymer network comprising a plurality of permanent cross-links and coupled to a plurality of reversible cross-links that are dissociable with the application of a stimulus and associable with the removal of the stimulus, wherein the shear storage modulus of the polymer network is less than about $4 \times 10^4$ Pa in the presence of the stimulus and greater than about $4 \times 10^4$ Pa in the absence of the stimulus.

Other and further embodiments of the invention are described in more detail below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention include polymeric materials having reversible mechanical and adhesive properties and methods of preparing polymeric materials having reversible mechanical and adhesive properties. Polymer materials and methods of preparing polymer materials in accordance with embodiments of the present invention, may advantageously utilize softer materials to provide enhanced adhesion and damping, whereas these same materials would not work well in typical shape memory polymer applications as the high damping would not provide adequate force transfer for actuation or the ability to recover on a high friction surface. Additionally, polymeric materials and methods of preparing polymeric materials in accordance with embodiments of the present invention may advantageously provide the ability to transition dynamically between low and high tack adhesion states allowing for high adhesion when desired and a decreased pull-off force when needed, and can dynamically alter the damping behavior of the material or material system to change the material compliance.

Figure 1:
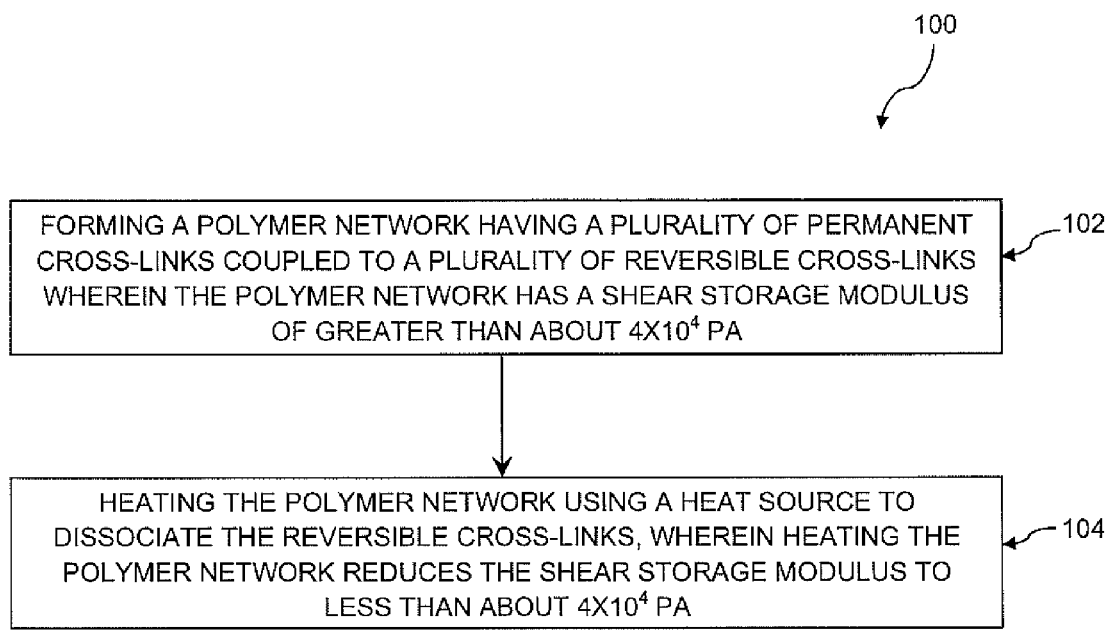
FIG. 1 depicts a flowchart of a method of making polymeric materials in accordance with some embodiments of the present invention.
Figure 2:
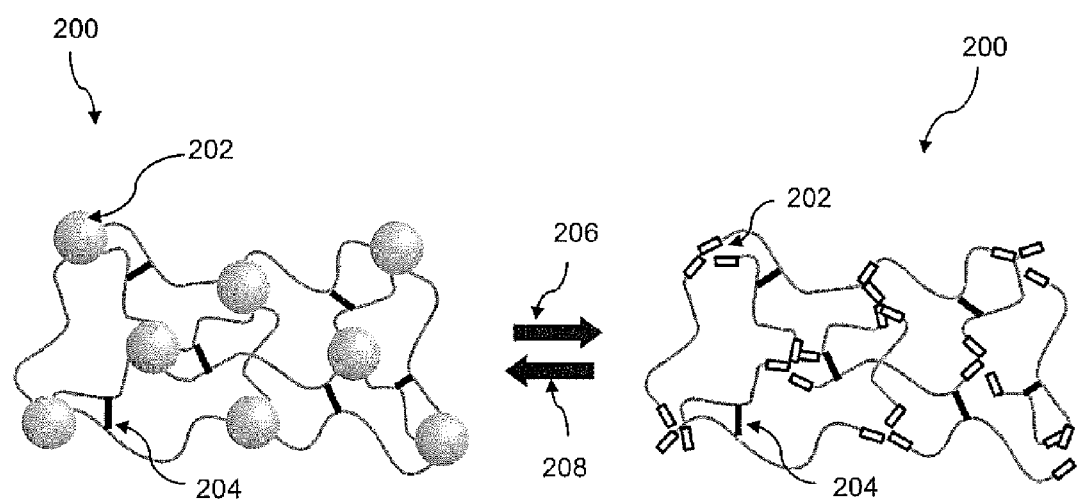
FIG. 2 depicts a polymeric material in accordance with some embodiments of the present invention.

FIG. 1 depicts a flow diagram of a method 100 of adjusting the mechanical properties of a polymeric material. The method 100 is described herein with respect to the structure depicted in FIG. 2. The method 100 starts at 102 by forming a polymer network 200 having a plurality of permanent (i.e. chemical) cross-links 204 coupled to a plurality of reversible (i.e. physical) cross-links 202. The combination of reversible cross-links 202 and permanent cross-links 204 advantageously allows the polymer composite 200 to exhibit a responsive change in mechanical and adhesive performance. The polymer network 200 has a shear storage modulus of greater than about $4 \times 10^4$ Pa.

In some embodiments, the polymer used in the polymer network 200 is, for example, an elastomeric polymer such as poly[styrene-b-(ethylene-co-butylene-g-maleic anhydride)-b-styrene] (hereinafter "SEBS-MA"), poly(styrene-b-ethylene-co-butylene-b-styrene), poly(styrene-b-isoprene-b-styrene), poly(styrene-b-butadiene-b-styrene), natural rubber, polybutadiene, chloroprene, butyl rubber, nitrile rubber, silicone rubber, fluorosilicone rubber, poly(propylene oxide) rubber or the like.

In some embodiments, the reversible cross-links 202 in the polymer network 200 include any networks that form by phase separation or non-covalent cross-linking such as hydrogen bonded networks, metal co-ordination cross-linking, ionic interactions, crystalline domains, phase separated domains, or other physical associations.

In some embodiments, the permanent cross-links 204 in the polymer network 200 are typically formed through covalent bonding between polymer precursors. Examples of the chemical reaction used to permanently cross-link a polymer network 200 include epoxy-amine, epoxy-hydroxyl, "click", thiol-ene, vinyl-silane, urethane (carbamate), diol/anhydride vinyl (e.g. cross-linked polyesters), vulcanization/sulfur curing, and oxidative chemistries. The polymer network 200 can also be covalently cross-linked through exposure to a radiation source, such as gamma radiation, electron beam, and UV light.

Next at 104, the application of heat 206 to the polymer network 200 using a heat source dissociates the reversible cross-links 202. Heating the polymer network 200 reduces the shear storage modulus of the polymer network 200 to less than about $4 \times 10^4$ Pa. In some embodiments, the shear storage modulus of the polymer network 200 after heating is about $1 \times 10^3$ Pa to about $4 \times 10^4$ Pa. Upon removal of the heat 208, the reversible cross-links 202 associate resulting in an increase of the shear storage modulus to greater than about $4 \times 10^4$ Pa. In some embodiments, the heat source is any heat source suitable to dissociate the reversible cross-links 202, for example, ultra-violet light, a magnetic field, an electric field, or resistive heating. In some embodiments, the polymer network 200 is heated to a temperature of about 50 degrees Celsius to about 200 degrees Celsius to dissociate the reversible cross-links. However, the specific temperature at which the reversible cross-links dissociate is dependent upon the specific polymer in the polymer network 200.

The shear storage modulus of a cross-linked polymer network is proportional to the network cross-link density, provided the molecular weight between cross-links is not far greater, for example less than two times greater, than the entanglement molecular weight of the polymer. As the molecular weight between cross-links becomes much larger, for example about two times larger, than the entanglement molecular weight, the shear storage modulus of the polymer network 200 will be largely determined by the polymer entanglements rather than the cross-link density. The cross-link density of the polymer network 200 is determined by a combination of the reversible cross links 202 and the permanent cross-links 204. However, upon application of a stimulus, for example heat, light, electric/magnetic field, or the like, the reversible cross-links 202 dissociate and the cross-link density will be determined solely by the permanent cross-links 204. Using a minority fraction of permanent cross-links 204 relative to the reversible cross-links 202 will result in a dramatic drop in shear storage modulus which can lead to a substantial increase in the tack adhesion energy. For example, in some embodiments, a suitable ratio of permanent cross-links 204 relative to reversible cross-links 202, assuming complete dissociation of the physical cross-links, is about 3 to about 1 to achieve a substantial increase in tack adhesion energy. A person having ordinary skill in the art will recognize that a larger ratio of physical cross-links relative to chemical cross-links, for example a ratio of about 10 to about 1, or a ratio of about 100 to about 1, or a ratio about 1000 to about 1, will produce a more substantial difference in adhesive and mechanical properties upon heating.

The increase in tack adhesion is a combination of the incorporation of dangling chain ends along with enhanced adhesion when the shear storage modulus is reduced below $4 \times 10^4$ Pa according to the Dahlquist criteria. The Dahlquist criterion is an empirical observation of the rheological relationship to tack (see, for example, K. Autumn, et al., "Effective elastic modulus of isolated gecko setal arrays", The Journal of Experimental Biology 209, Published by The Company of Biologists 2006, pages 3558-3568.) Dangling chain ends in the polymer network 200 have a significant impact on the tack adhesion energy and mechanical damping characteristics of the polymer network 200. When the reversible cross-links 202 are dissociated, the individual chains will form dangling ends that can act as an energy dissipation mechanism to prevent adhesive failure. The incorporation of dangling chain ends increase the measured tack adhesion energy, or the force required to produce adhesive failure. The enhanced energy dissipation of the dangling chain ends can also be used to tune the viscoelasticity of the polymer network 200. In the initial state, prior to dissociation of the reversible cross-links 202, the polymer network 200 will act more like a perfect elastomer where energy entering the polymer network 200 is released with very little loss. However, when the reversible cross-links 202 are dissociated the dangling chain ends will produce a highly damping polymer network 200 where the energy entering the system is dissipated through molecular motions.

In some embodiments, the polymer network 200 comprises chemical functionalities that will photo-isomerize when exposed to a particular wavelength of light, for example a wavelength of about 100 nm to about 400 nm. Examples of suitable functional groups that photo-isomerize include azobenzenes, stilbenes, and their derivatives. Examples of suitable azobenzene derivatives include but are not limited to 4,4' diamino azobenzene, 4,4' dihydroxy azobenzene, 2,2' diamino azobenzene, 2,2' dihydroxy azobenzene, 2,4' dihydroxy azobenzene, 2,4' diamino azobenzene, 4-(4-nitrophylazo)aniline, azobenzene-4,4'-dicarbonyl dichloride, 1-amino-1,1'-azobenzne-3,4'-disulfonic acid, 4,4' diepoxy azobenzene, 2,4' diepoxy azobenzene, and 2,2' diepoxy azobenzene. Examples of suitable stilbenes derivatives includes but are not limited to 3,3',4,5'-tetrahydroxy-trans-stilbene, 2,3',4,5'-Tetrahydroxy-trans-stilbene, 4,4'-dicarboxystilbene, 4,4' diaminostilbene, 4,4' dihydroxystilbene, 2,4' diaminostilbene, 2,4' dihydroxystilbene, 2,2' diaminostilbene, 2,2' dihydroxystilbene, 4,4' diepoxystilbene, 2,4' diepoxystilbene, and 2,2' diepoxystilbene. A person of ordinary skill in the art will recognize that other suitable azobenzenes derivatives and stilbenes derivatives may provide chemical functionalities that will photo-isomerize when exposed to a particular wavelength of light. Specifically, trans-azobenzene converts to cis-azobenzene when exposed to UV light with a wavelength between 300 and 400 nm. Conversion of the cis-azobenzene form back to the trans-azobenzene form can be accomplished using light with a wavelength greater than about 400 nm. Incorporating these functionalities into the polymer network and applying a broad wavelength light source will advantageously produce a rapid heating of the polymer network 200. This is attributed to the broad wavelength light source providing a driving force for transition to the trans and cis conformations, producing rapid molecular motions, and excess heat formation.

In one embodiment, a suitable polymeric material is formed from a mixture of SEBS-MA and mineral oil at a polymer loading of about 20 vol. % to about 30 vol. % SEBS-MA. The mixture is heated to 150 degrees Celsius and intermittently mixed for 3 hours to produce a homogeneous melt. Control samples of the polymeric material were produced by casting the homogeneous melt into a mold and removing the air bubbles, entrapped as the result of mixing, under vacuum at 150 degrees Celsius. Cross-linked samples of the polymeric material were produced by adding polycaprolactone (Cap900: M=900 g/mol) in a 1:1 stoichiometric ratio of the hydroxyl groups on the Cap900 to the SEBS-MA maleic anhydride groups along with a small amount of mineral oil to maintain an overall solids content at about 20 vol. % to about 30 vol. %. The solution was cast and the mixing bubbles were removed under vacuum at 150 degrees Celsius. The samples were then heated at 110 degrees Celsius for 48 hours to allow the reaction to proceed between the maleic anhydride and the hydroxyl groups.

Figure 3:
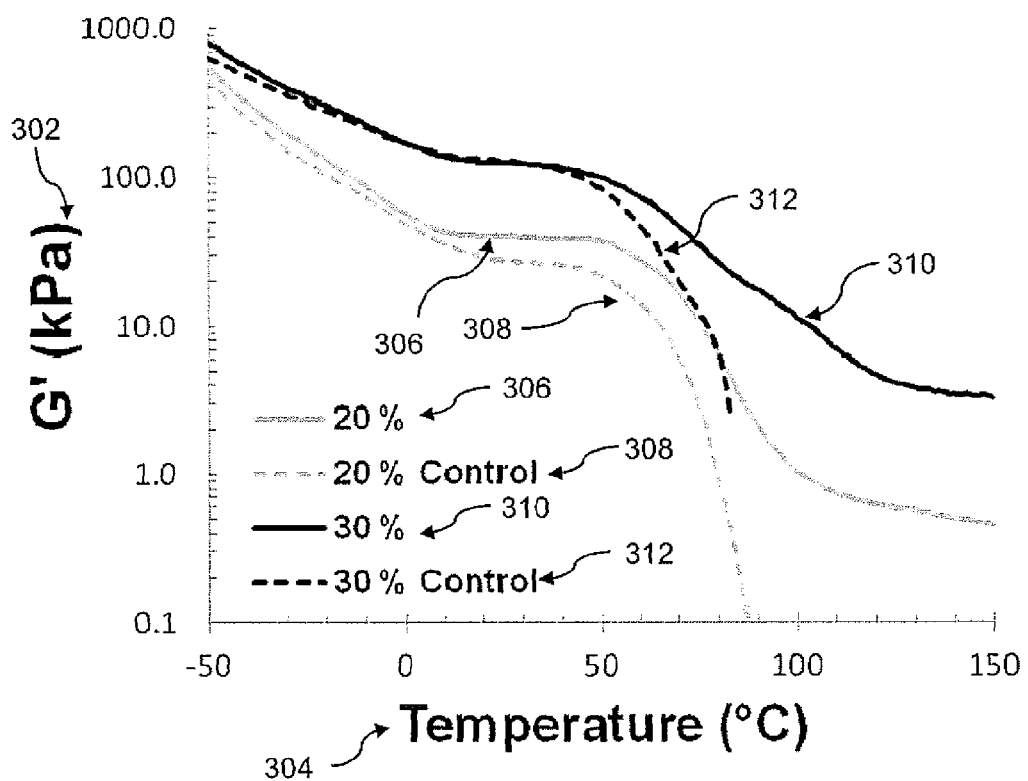
FIG. 3 depicts a graph of the shear storage modulus of a polymeric material as a function of temperature for a polymeric material in accordance with some embodiments of the present invention.

The temperature dependent shear storage modulus of the SEBS-MA and mineral oil gel samples cross-linked with Cap900 were compared to gel samples that were not reacted with Cap900. FIG. 3 depicts the shear storage modulus 302 of a polymeric material as a function of temperature 304 for a mixture of SEBS-MA and mineral oil with, and without, chemical cross-linking with Cap900 at about 20 vol. % and at about 30 vol. %. A first control sample 308, having about 20 vol % SEBS-MA and no Cap900, has a shear storage modulus of 35 kPa in the plateau region from 15 degrees Celsius to 50 degrees Celsius followed by a rapid decrease in shear storage modulus to a melt state by 90 degrees Celsius. A first cross-linked sample 306, having 20 vol % SEBS-MA and reacted with Cap900, exhibits an increased shear storage modulus of about 45 kPa in the plateau region consistent with an increase in the cross-link density. Similar to the first control sample 308, the first cross-linked sample 306 also exhibits a rapid decrease in shear storage modulus from 50 degrees Celsius to 110 degrees Celsius. However, the first cross-linked sample 306 forms a secondary shear storage modulus plateau region from 110 degrees Celsius until the end of the experiment at 150 degrees Celsius. The second plateau region of the shear storage modulus is attributed to the covalently cross-linked network that has been formed from the reaction of the Cap900 and the grafted maleic anhydride groups. Similar behavior was also observed in a second cross-linked sample 310 having a polymer content of about 30 vol. % and reacted with Cap900. The shear storage modulus in the plateau region was increased to about 120 kPa with the additional polymer content consistent with polymer scaling theory. The plateau modulus of the second cross-linked sample 310 was not increased significantly relative to the second control sample 312. However, the second cross-linked sample 310 does exhibit a secondary shear storage modulus plateau above 120° C. indicating the presence of chemical cross-linking. This data demonstrates the potential to tailor the shear storage modulus of the plateaus by altering the polymer content and cross-linking stoichiometry.

The tack adhesion of a polymeric gel material containing SEBS-MA and mineral oil and cross-linked with Cap900 was measured at 25 degrees Celsius and 100 degrees Celsius at polymer contents of 20 vol % and 30 vol %, respectively. Tack adhesion testing was performed using sample discs with a thickness of about 5 mm and diameter of about 40 mm, placed onto a 50 mm plate. A stainless steel probe (8 mm diameter) was brought into contact with the gel film and held for 60 seconds at a force of 0.5 N. The probe was pulled away from the gel at 0.5 mm/s, while measuring the force displacement curve. The temperature for the tack measurements was held constant utilizing an environmental chamber. The sample was allowed to equilibrate at the measurement temperature for 10 minutes prior to each measurement. To get an effective tack adhesion energy, the stress (force/gel cross-sectional area)—strain (displacement/film thickness) curve was integrated and multiplied by the gel sample thickness. The gel cross-sectional area was calculated, assuming a Poisson's ratio of 0.5, typical for a rubbery polymer.

Figure 4:
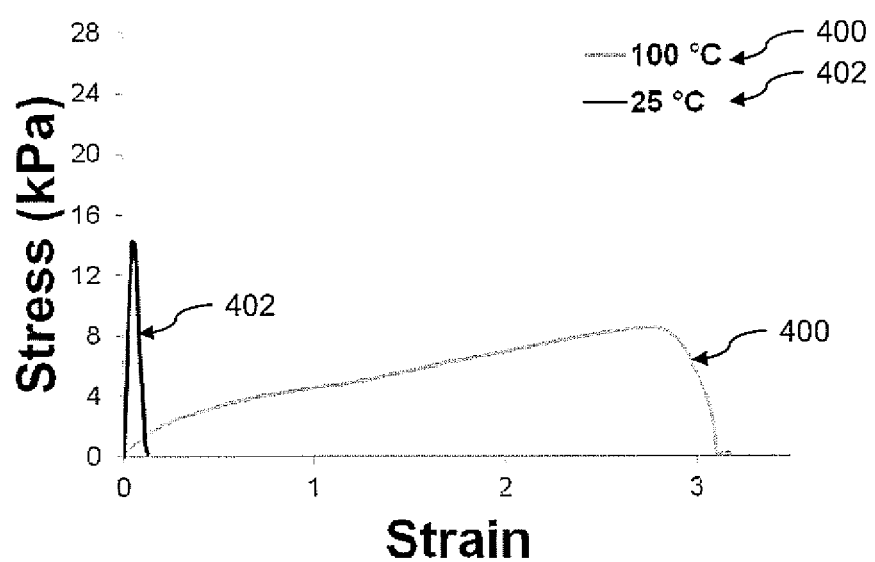
FIG. 4 depicts a stress-strain curve produced from tack adhesion testing of a polymeric material in accordance with some embodiments of the present invention.

FIG. 4 depicts a stress strain curve produced from tack adhesion testing of a 20 vol. % SEBS-MA and mineral oil polymeric gel cross-linked with Cap900 measured at 25 degrees Celsius and 100 degrees Celsius. A first stress-strain curve 402, depicting a 20 vol % polymer sample measured at 25 degrees Celsius, exhibits an adhesive strength of about 15 kPa and low adhesive toughness. A second stress-strain curve 400, depicting a 20 vol % polymer sample measured at 100 degrees Celsius, exhibits adhesive strength reduced by 30%. However, the adhesive toughness is increased 1700% while exhibiting elongations of nearly 300%. The increased adhesion is attributed to the shear storage modulus decreasing well below the Dahlquist criteria for tack adhesion in polymeric networks and the increased number of dangling chain ends in the polymeric material more effectively dissipating the energy through molecular motions.

Figure 5:
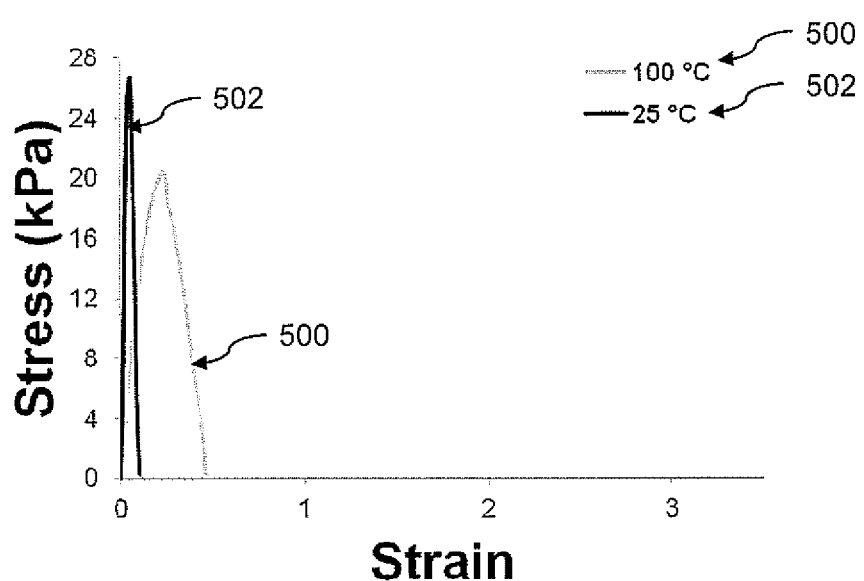
FIG. 5 depicts a stress-strain curve produced from tack adhesion testing of a polymeric material in accordance with some embodiments of the present invention.

FIG. 5 depicts a stress strain curve produced from tack adhesion testing of a 30 vol. % SEBS-MA and mineral oil polymeric gel cross-linked with Cap900 measured at 25 degrees Celsius and 100 degrees Celsius. A first stress-strain curve 502, depicting a 30 vol % polymer sample measured at 25 degrees Celsius exhibits similar behavior where the 25 degrees Celsius adhesion has a high strength (27 kPa) and a low adhesive toughness. A second stress-strain curve 500, depicting a 30 vol. % polymer sample measured at 100 degrees Celsius shows that the adhesive strength was reduced 25%, accompanied by a 560% increase in toughness. The smaller relative increases in adhesion in the 30 vol. % polymer sample relative to the 20 vol. % polymer sample is attributed to the difficulty in measuring the adhesion at elevated temperatures. Temperatures above 100 degrees Celsius resulted in a small amount of volatilized mineral oil depositing on the tack probe leading to an artificially reduced adhesion value. While testing at 100 degrees Celsius provided higher fidelity testing, the 30 vol. % samples have not reached the second shear storage modulus plateau indicating incomplete disassociation. As a result, the high temperature adhesion may be improved for both samples upon identification of a suitable solvent with lower volatility.

In some embodiments, the polymeric gel material comprising SEBS-MA and mineral oil gel cross-linked with Cap900 is integrated into carbon fiber composites. Composite fabrication can be accomplished utilizing a wet-layup technique. A single sheet of a basic two-dimensional carbon fiber weave pattern was placed on release ply. A layer of uncured polymer gel was spread over the sheet. Alternating layers of gel and carbon fiber sheets were stacked to a final thickness of 9 carbon fiber sheets. The assembly was then placed into a vacuum bag and a vacuum was applied while the sample was heated to 150 degrees Celsius to allow the gel to diffuse through the carbon fiber. Samples containing 30 vol. % SEB-MA and Cap900 in mineral oil were mixed immediately before production to avoid cross-linking prior to processing. After the gel had diffused through the carbon fiber, the temperature was decreased to 110 degrees Celsius and the setup was left for 48 hours to allow the gel to cross-link. To increase the reaction progress, the samples were heated at 150 degrees Celsius for an additional 2.5 hours. The gel infiltration was very uniform in the fiber lay-up however, on close inspection the individual fibers do not appear to be completely encapsulated by the gel. Incomplete encapsulation can potentially have a pronounced impact on the stiffness, durability, and temperature response of the material. Enhanced encapsulation of the fibers may be accomplished through a vacuum-assisted resin transfer molding (VARTM) process. In VARTM processing, the sample is placed in a vacuum bag attached to a resin reservoir. Upon application of the vacuum the resin is drawn through the sample, displacing the air, and providing more uniform encapsulation of the fabric and minimizing air voids.

Rheological measurements were made with rectangular gel samples in a torsion geometry. The measurements were made with samples having dimensions of approximately 12×4.5×28 mm. Samples were cut from the composite by placing a razor blade on the surface and lightly tapping to push through the sample at 0° and 45° to the fiber orientation. Attempted sample fabrication by dragging the blade across the sample resulted in delamination. The measurements were made on an Anton Paar MCR 501 instrument at a frequency of 1 Hz and a scan rate of 2 degrees Celsius/min. An environmentally-controlled oven permitted determination of the shear storage modulus over temperatures from about negative 50 degrees Celsius to 150 degrees Celsius. Strain sweeps were conducted at various temperatures to ensure that the shear storage modulus was independent of strain at a frequency of 1 Hz. As expected, carbon fiber composites containing gels with 30 vol. % SEBS cross-linked with Cap900 gels exhibited significant increase in the shear storage modulus relative to the gel in the absence of carbon fiber.

Figure 6:
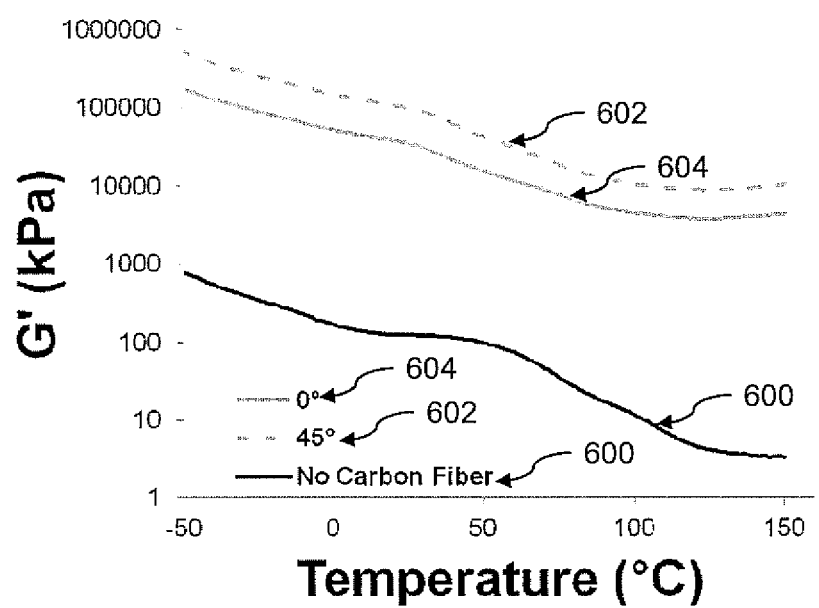
FIG. 6 depicts a comparison of the shear storage modulus temperature dependence of a polymeric material in accordance with some embodiments of the present invention.

FIG. 6 depicts a comparison of the shear storage modulus temperature dependence in a first sample 600 having an absence of carbon fiber, a second sample 602 cut 45° relative to the carbon fiber direction and a third sample 604 cut 0° relative to the carbon fiber direction. The carbon fibers also exhibited a reduced breadth of the low temperature plateau in the shear storage modulus that extends to about 35 degrees Celsius compared to about 50 degrees Celsius in the gel. The incorporation of the carbon fiber introduces changes to the thermal conductivity, heat capacity, and internal friction of the material that will alter the temperature-dependent response. More importantly, the composites also exhibit a secondary plateau at high temperatures to produce a reversible change in stiffness of about 10×. As anticipated, the fiber orientation also impacted the mechanical properties of the composite. The shear storage modulus of the second sample 602 cut 45° to the fiber orientation exhibited a nearly 5-fold increase in shear storage modulus relative to the third sample 604 throughout the temperature range. However, it is important to note that this is consistent with the twisting motion of the rheometer and that no bending tests have been performed at this time. Qualitatively, the third sample 604 felt much stiffer than the second sample 602 when bending it end to end. While this behavior was expected, it demonstrates utilizing the fiber orientation as an addition mechanism to tailor the material performance.

Figure 7:
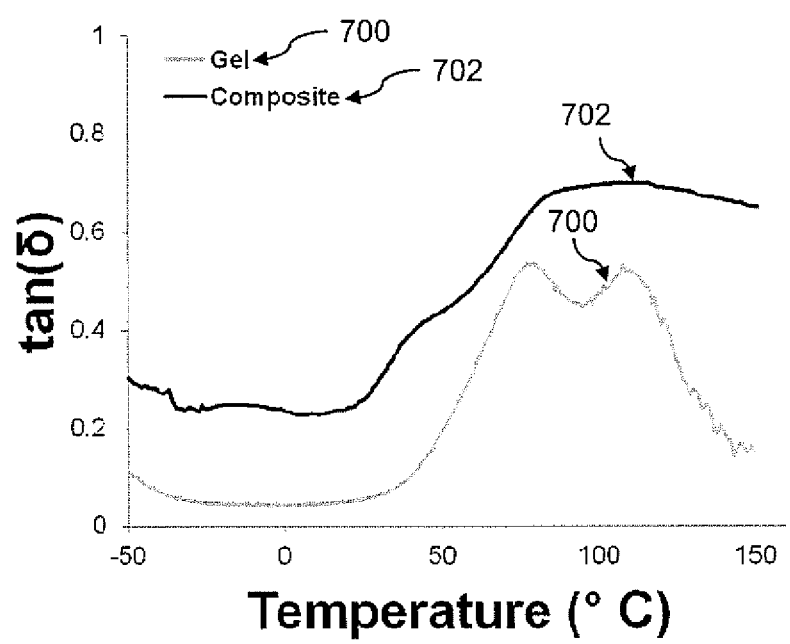
FIG. 7 depicts temperature dependent damping for a polymeric material in accordance with some embodiments of the present invention.

Another aspect of these polymeric materials with significant technological importance is the ability to responsively tune the damping or viscoelastic characteristics of the material. The damping coefficient of the material is typically reported as the tangent of the shear loss modulus to shear storage modulus ratio (tan δ). The tan δ will vary between 0 and 1, where 0 is a perfectly elastomeric, or "lossless", material that stores and releases all energy put into it and 1 is a highly damping material that exhibits near perfect energy dissipation. FIG. 7 depicts temperature dependent damping for a polymeric gel material comprising 30 vol. % SEBS-MA and mineral oil cross-linked with Cap900. In the absence of carbon fiber, the gel 700 exhibits a low temperature damping factor of 0.1 and a high temperature damping factor of 0.5. A significant change in the damping factor with temperature is also observed when the gel is incorporated into the carbon fiber. The carbon fiber composite 702 exhibits a low temperature damping factor of 0.2 and a high temperature damping factor of 0.7. The increased damping factors relative to the pure gel is attributed to losses due to friction between carbon fibers. The damping factors may be reduced through more complete infiltration of the gel around the fibers utilizing a VARTM process. In addition, the damping factor increasing nearly linearly with increasing temperature from 35° Celsius to 90° Celsius. This allows for the potential to dynamically provide a wide range of damping characteristics demonstrating the feasibility of utilizing the invention to impart responsiveness into material assemblies.

In some embodiments, as discussed above azobenzene functionalities are incorporated into a polymer network to provide heating in response to UV light exposure. For example, in one embodiment, 0.135 g of 4,4' diamino azobenzene was mixed with 5.135 g of dibutyl phthalate (DBP) and sonicated for 60 minutes. Subsequently, 5 g of maleic anhydride-functionalized polybutadiene (MA5) was mixed into the solution and quickly poured into a mold. The samples were then cured for 6 days at 72 degrees Celsius to allow ample time for full network formation. The samples were then placed into DBP for 1 month while periodically monitoring mass uptake to determine the extent of swelling. The swelling was determined to be at equilibrium when the mass remained constant for 7 days.

Upon exposure of the cured samples to a 100 W Omnicure 81000 broadband UV light source (320-500 nm; Lumen Dynamics Group, Mississauga, Ontario, Canada) the sample started to curl towards the light source, followed by vapor generation, and finally charring of the material all within 20-30 seconds of exposure. Upon removal from the UV light source the samples remains warmer to the touch than is expected from typical heating associated with UV exposure. The vapor generation is attributed to DBP volatilization and degradation of the polymer network. To demonstrate the utility of UV induced heating, a sample of the azobenzene network was placed in 1 mL of water. After irradiation for 2 minutes water vapor condensation was observed on the vial indicating volatilization of the water. The UV irradiation did not produce a significant temperature increase of the water bath and no water vapor condensation was observed when irradiating water alone. A sample of the azobenzene network was also placed in a thermoplastic elastomer gel 1 cm thick that had been fractured midway through the thickness. Upon irradiation, the area around the azobenzene network melted. When the UV light was removed, the gel cooled to repair the fracture local to the azobenzene network but did not impact the surrounding area. This demonstrates the potential for using these systems to provide "remote-healing" of materials.

The invention can be implemented into a wide variety of applications that can benefit from controlled reversible adhesion and/or controlled damping as a soft polymer gel or integrated into a larger materials system. Examples of specific applications include:

Robotic Manipulation: Reversible adhesion can be utilized to better grasp and manipulate an object while maintaining the ability to release the object. This has the potential to significantly simplify a robotic manipulator with potential reductions in size, weight, and power requirements Robotic Mobility: Reversible adhesion can be utilized to better push or pull a robot across terrain. The reversible adhesion will provide better traction when exhibiting high adhesion while requiring less power to lift and replace the appendage in the low adhesion state.

Robotic Gait Control: The ability to control damping will allow for rapid transition of effective mobility between rigid (i.e. concrete) and soft (i.e. sand) terrain. In addition, there has been recent interest in determining the role of spine damping on the gait of a quadruped robot. Current designs utilize a spring with controlled tension. This invention can be incorporated into currently used carbon fiber composites to provide tunable damping with minimal design changes.

Robotic Jumping: To facilitate the desire for controlled robotic jumping the appendage must be elastic to store and release the energy required to jump while displaying high damping to avoid damage upon landing. This invention can simplify the design of a jumping robotic platform with potential reductions in the size, weight, and power consumption. The reduced weight is a critical benefit as a reduced weight will require less force for the same trajectory or provide greater jumping ability with similar power input.

Dielectric elastomer actuators: A dielectric elastomer actuator (DEA) is essentially a soft, conformal capacitor. When the electrodes are charged they are drawn together producing a mechanical force and expansion of the device. The invention could be incorporated into a DEA design to provide tunable expansion by changing the damping of the components to produce more or less efficient transfer of the mechanical force.

Tagging and Tracking: The invention can be utilized to attach a data collection device to a target and then controllably reduce the adhesion to remove and recover the device for data analysis.

Responsive Energy Dissipation: The invention can be incorporated into a materials system that under normal operating conditions remains relatively rigid but upon an impact event the material will heat to change the network structure and enhance the energy dissipation of the material.

Remote Healing: The UV induced heating may be used to repair thermally activated materials without taking them out of service or implementing a complete replacement.

Responsive shoe soles/inserts (Diabetic Patients): A common issue associated with diabetes is loss of sensation in the feet. As a result, areas of enhanced wear as the result of excessive heat go unnoticed until the tissue is damaged. One remedy is to utilize shoe soles with a compartmentalized design where portions can be removed. This is a reactive treatment whereas the invented material could be used to preferentially soften at the points where the foot is overheating to alleviate the pressure and avoid damage.

While the foregoing is directed to embodiments of the present invention, other and further embodiments of the invention may be devised without departing from the basic scope thereof.

The invention claimed is:

1. A method of adjusting the mechanical properties of a polymeric material, comprising:
    forming a polymer network having a plurality of permanent cross-links and coupled to a plurality of reversible cross-links, wherein the polymer network has a shear storage modulus of greater than about $4 \times 10^4$ Pa and less than about 4 MPa and further comprises a function group of one of an azobenzene, a stilbenes, an azobenzene derivative, or a stilbenes derivative that photoisomerizes upon exposure to light having a wavelength of about 100 nm to about 400 nm; and
    heating the polymer network using a heat source to dissociate the reversible cross-links, wherein heating the polymer network reduces the shear storage modulus to less than about $4 \times 10^4$ Pa.

2. The method of claim 1, wherein the reversible cross-links are one of hydrogen bonded networks, metal coordination cross-links, ionic interactions, crystalline domains, or phase separated domains.

3. The method of claim 1, wherein the permanent cross-links are covalent bonds.

4. The method of claim 1, wherein the heat source is at least one of ultra-violet light, an electric field, or a magnetic field.

5. The method of claim 1, wherein the polymer network is heated to a temperature of about 50 degrees Celsius to about 200 degrees Celsius to dissociate the reversible cross-links.

6. The method of claim 1, wherein heating the polymer network forms a plurality of dangling polymer chain ends in the polymer network.

7. The method of claim 1, further comprising removing the heat source to recombine the reversible cross-links.

8. The method of claim 1, wherein the shear storage modulus of the polymer network after heating is about $1 \times 10^3$ Pa to less than about $4 \times 10^4$ Pa.

9. A polymeric material comprising:
a polymer network comprising a plurality of permanent cross-links and coupled to a plurality of reversible cross-links that are dissociable with the application of a stimulus and associable with the removal of the stimulus, wherein the shear storage modulus of the polymer network is less than about $4 \times 10^4$ Pa in the presence of the stimulus and greater than about $4 \times 10^4$ Pa in the absence of the stimulus and further comprises a function group of one of an azobenzene, a stilbenes, an azobenzene derivative, or a stilbenes derivative that photo-isomerizes upon exposure to light having a wavelength of about 100 nm to about 400 nm wherein the stimulus heats the polymer network from about 50 degrees Celsius to about 200 degrees Celsius, further wherein the stimulus is at least one of ultra-violet light, an electric field or a magnetic field.

10. The material of claim 9, wherein the reversible cross-links are one of hydrogen bonded networks, metal coordination cross-links, ionic interactions, crystalline domains, or phase separated domains.

11. The material of claim 9, wherein the permanent cross-links are covalent bonds.

12. The material of claim 9, wherein the shear storage modulus of the polymer network after applying the stimulus is about $1 \times 10^3$ Pa to about $4 \times 10^4$ Pa.

* * * * *